United States Patent Office 3,096,742
Patented July 9, 1963

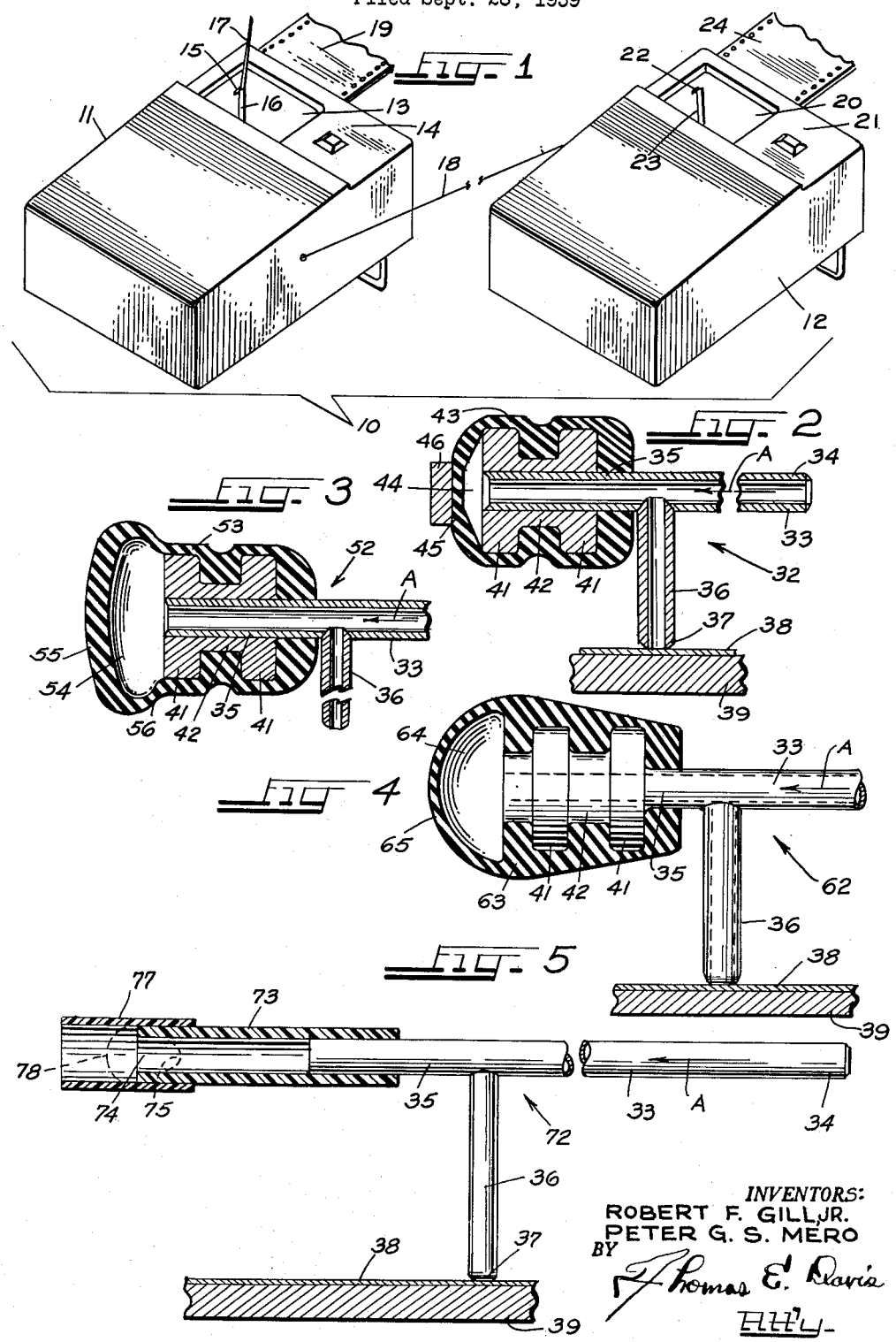
July 9, 1963     R. F. GILL, JR., ET AL     3,096,742
RECORDING DEVICE
Filed Sept. 28, 1959
INVENTORS:
ROBERT F. GILL, JR.
PETER G. S. MERO
BY Thomas E. Davis
ATTY.

3,096,742
RECORDING DEVICE
Robert F. Gill, Jr., La Grange, and Peter G. S. Mero, Winnetka, Ill., assignors, by direct and mesne assignments, to Victor Comptometer Corporation, Chicago, Ill., a corporation of Illinois
Filed Sept. 28, 1959, Ser. No. 842,693
8 Claims. (Cl. 120—42.06)

This invention relates to a new and improved recording apparatus and more particularly to a new and improved pen structure for use in a graphic communication system recorder or in similar recording apparatus in which the pen may be moved substantially omnidirectionally and may be subjected to substantial acceleration.

In many different recording instruments, data is recorded by means of a stylus or pen which is moved by electrically controlled apparatus across the surface of a suitable recording medium, usually a sheet of paper. In instruments of this kind, the speed of movement may be relatively low and the acceleration to which the pen is subjected may also be relatively low and may present no substantial problems with respect to consistency in the recording operation. In other applications, however, and particularly in graphic communication systems, the operating characteristics of the recording stylus or pen constitute a highly critical and important factor in operation of the recorder. In a system of this kind, the movement of a recording pen at either the transmitter or receiver station may be relatively rapid and irregular and may subject the pen to substantial and varying acceleration. This is particularly true when the system is used for transmission and recording of rapidly-drawn sketches or when the system operator writes a message quite rapidly. Moreover, in systems of this kind the pen may frequently be moved into and out of contact with the recording medium to differentiate between words or for other purposes in delineating the data being transmitted and recorded.

In many instances, it is desirable to use a fluid ink or other writing liquid (hereinafter referred to as "ink" in a generic sense to include any writing liquid) material which serves as the recording medium. In order to reduce the weight of the pen, particularly in the receiver, it is usually necessary to locate the ink supply at some point separated from the pen itself and to conduct the ink to the pen through a relatively small ink conduit. An ink system of this kind, however, although it affords substantial advantages as compared with other ink supply arrangements, also introduces certain problems, particularly where the recording pen is likely to be moved in virtually any direction and to be subjected to substantial acceleration. Rapid acceleration of the pen does not always, in and of itself, interfere with efficient and effective operation thereof. For example, there are a number of high-speed recording instruments in which a web of record-receiving material, such as paper, is moved past a recording pen and the pen is moved in an arcuate path, across the web, during the recording operation. In an instrument of this kind, rapid acceleration of the pen may subject the ink to a substantial centrifugal force which may be effective to compensate for increased ink demand at the desired maximum operating velocity of the pen. Thus, by taking the effect of centrifugal force into account, along with other factors affecting ink flow, pens may be constructed for arcuate movements at average velocities of the order of 350 centimeters per second and accelerations up to nearly 200 gravities.

The situation is substantially different, however, in a system in which the pen is not restricted to movement in an arcuate path but may be moved in virtually any direction. If the pen is accelerated toward the ink supply or accelerated in a direction transverse to the ink conduit, there is no substantial interference with the feeding of ink to the pen. In fact, rapid acceleration toward the ink supply may tend to increase the amount of ink available at the pen. On the other hand, if the pen is subjected to substantial acceleration in a direction parallel to the ink conduit and away from the ink source, the supply of ink to the pen may fail. Under these circumstances, a part of the data is omitted in the reproduction and, as a result, the recording may be unintelligible to at least some extent.

This problem of ink supply failure, which results in "skipping" in the recorded data, might be partially alleviated by increasing the size of the ink conduit or by pumping ink through the conduit to counteract the above described acceleration effect. If this is done, however, there is a substantial danger that flooding of ink will occur when the pen is accelerated toward the ink source. A compromise design may result in occasional flooding and occasional skipping, a result which is completely undesirable.

It is a primary object of the invention, therefore, to effectively overcome or eliminate the above noted problems and difficulties presented in a fluid ink pen as utilized in a graphic communication system recorder or in similar recording apparatus in which the recording pen may be moved substantially omnidirectionally under substantial and varying acceleration.

A more specific object of the invention is to provide a relatively constant ink supply to the recording pen in a recording apparatus in which the pen may be accelerated to a substantial extent in a direction either toward or away from the ink source.

Another object of the invention is to counteract and compensate for acceleration, inertial and momentum forces, in a pen utilized in a graphic communication system recorder or similar recording apparatus, to eliminate skipping of the pen and at the same time avoid excesisve ink flow from the pen.

A particular object of the invention is to provide a movable quantity of ink, in an extension of the ink conduit beyond the writing point of a recording pen, to supply ink to the pen when it is accelerated in a direction parallel to the ink conduit and away from the ink supply.

A further object of the invention is to provide an ink reservoir structure which is effective to counteract acceleration effects in the operation of a fluid ink pen and to utilize the same structure to protect the pen against external forces.

A specific object of the invention is to provide a self-protected pen for a graphic communication system recorder or similar recording apparatus which inherently and automatically compensates for acceleration effects in operation of the pen, yet which is relatively inexpensive and economical in construction.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a perspective view of a graphic communication system in which the present invention may be utilized;

FIG. 2 is an enlarged sectional view of a recording pen constructed in accordance with one embodiment of the invention;

FIG. 3 is a detail sectional view, similar to FIG. 2, of another embodiment of the invention;

FIG. 4 is a detail view, partly in cross section, of a further embodiment of the invention; and FIG. 5 is a detail view, drawn to an enlarged scale and partly in cross section, of a counter-acceleration pen constructed in accordance with a preferred embodiment of the invention.

The communication system 10 illustrated in FIG. 1 comprises a transmitting station 11 and a receiving station 12. In a typical system, the stations 11 and 12 may each comprise a transceiver unit capable of operation as either a receiver or a transmitter; for the purpose of illustrating the present invention, however, station 11 is assumed to be a transmitter and station 12 to be a receiver.

The transmitter 11 includes a writing surface 13 which is encompassed by a frame 14; a writing pen or stylus 15 is mounted upon a support arm or link 16 for movement into and out of engagement with the writing surface 13. Stylus 15 is also movable transversely of the writing surface and is provided with a pen-like actuator or control device 17. Thus, manual control of the stylus 15 by means of the actuator 17 permits the transcription of a message upon a recording medium such as the paper web 19 supported upon the writing surface 13. The message may comprise words, sketches, or any other data capable of reproduction by the stylus 15. The support arm 16 constitutes a part of a linkage system which controls the operation of electrical transmitter circuits within the transmitter unit 11; these transmitter circuits are utilized to develop suitable stylus-control signals which are transmitted to the receiver 12 as by a conductive line 18 interconnecting the two stations of the system.

The receiver unit 12 includes a writing surface 20 which is essentially similar in configuration to the transmitter writing surface 13 and which is bounded by a frame 21. A receiver stylus 22 is mounted upon a support arm or link 23 for movement into and out of contact with a paper web or other recording medium 24 supported on the writing surface 20 to inscribe a message or other data upon the paper. In general, the structural details and transmission system utilized in the communication apparatus of FIG. 1 are not critical with respect to the present invention. Preferably, the communication apparatus is similar to that described and claimed in United States Patent No. 2,583,535 to Robert Adler, issued January 29, 1952, and in United States Patent No. 2,649,503 to Robert Adler, issued August 18, 1953; both of these patents are assigned to the same assignee as the present invention. Accordingly, reference may be had to these patents and to other previously known graphic recording systems to determine the general construction and operation of the system of FIG. 1.

As noted hereinabove the writing surface 13 of the transmitter 11 is covered with a suitable recording medium 19 which preferably comprises ordinary paper, and the writing surface 20 of the receiver 12 is covered with the paper web 24. The data to be transmitted is written, drawn, or otherwise inscribed on the recording medium at the transmitter writing surface 13. The movements of the stylus or pen 15 in transcribing this data are translated into electrical control signals which are transmitted to the receiver 12. In the receiver 12, these control signals are utilized to control suitable apparatus which moves the receiver recording stylus 22 across the writing surface 20 and into and out of contact therewith in synchronism with movements of the transmitter stylus. Thus, the message transcribed at the transmitter 11 is reproduced in essentially its original form at the receiver 12.

As noted hereinabove, it is usually undesirable to mount a fluid ink reservoir on either of the pen support arms 16 and 23, in the recording system 10, because the weight of the arms and the pens must be held as low as possible. This is particularly true with respect to the receiver pen 22 and its support arm 23, since any substantial addition to the weight and inertia of these members tends to reduce the accuracy with which the data transcribed with the transmitter 11 is reproduced by the receiver 12. Consequently, the pen 22 is usually supplied with ink by relatively small ink conduit that is mounted upon and supported by the arm 23. Preferably, this ink conduit comprises an elongated capillary tube which extends parallel to the arm 23 and is affixed thereto so that it moves with the arm, a flexible connection being provided within the housing of the receiver 12 to connect the ink conduit to a suitable ink source. The same construction may be used at the transmitter 11, particularly if this is a transceiver unit.

In writing or drawing data with the transmitter pen 15 and the actuator 17, the system operator may accelerate the pen 15 to a substantial extent along a line parallel to the arm 16, which carries an ink conduit connected to the pen 15. In fact, this occurs quite frequently in normal handwriting and in many other instances. If the direction of acceleration of the arm 16 and the pen 15 is back toward the ink source within the housing of the transmitter 11, there is a tendency to force ink outwardly of the pen at a greater rate than if the pen were moved in a transverse direction with respect to the axis of the arm 16. On the other hand, if the pen and the arm are accelerated to a substantial extent in a direction parallel to the arm and away from the ink source, the flow of ink through the conduit connected to the pen 15 is effectively retarded, in relation to movement of the pen, due to the inertia of the ink. Consequently, rapid movements of the pen and arm 16 parallel to the axis of the arm, which carries the ink supply conduit, may result either in "skipping" or in "flooding" in the recorded data.

This problem is, if anything, even more acute at the receiver 12 where the motions of the arm 16 and the pen 15 are duplicated by the arm 23 and the pen 22. Thus, it is possible to provide a separate ink supply for the transmitter pen, usually as a part of the pen actuator 17, without interfering with operation of the system, because the operator can supply the necessary force, manually, to move the additional weight across the recording surface 13. At the receiver 12, however, this is not generally feasible. Moreover, if the units 11 and 12 are transceiver devices, each presents essentially the same problems and difficulties as a receiver.

FIG. 2 is a detail sectional view of a recording pen, constructed in accordance with the invention, which is effective to overcome or minimize acceleration effects on the ink supply and at the same time to protect the pen itself against bumping or jarring by a machine operator or by engagement of the end of the pen with any part of the frame 21. FIG. 2 is drawn to an enlarged scale, as compared with the actual size of typical pen construction, the parts being illustrated at approximately twice their normal size. The pen structure 32 shown in FIG. 2 is, of course, supported upon a suitable support member such as the arm 23 used in connection with the pen 22 in FIG. 1. However, since the mounting structure for the pen is not critical with respect to the present invention, it has not been shown in the drawing. The pen 32 illustrated in FIG. 2 may be utilized in a transmitter, such as the transmitter 11, but is most advantageous when applied to a transceiver or to a receiver unit such as the unit 12.

The recording pen 32 comprises an ink feeder tube 33 which is preferably a capillary tube and which may be formed from relatively lightweight metal tubing or other suitable tubing preferably treated to have, or which intrinsically has, a low contact angle relative to the ink used in the pin. Of course, the ink conduit 33 must be substantially inert, in a chemical sense, with respect to the ink. The ink conduit 33 is relatively long, in most instances, and may, for example, have an overall length of the order of five or six inches. One end 34 of the ink feeder tube 33 is connected to an ink supply, the ink supply not being illustrated in the drawing since it may be substantially conventional in construction.

At the opposite end 35 of the ink supply tube 33, a nib member 36 is connected to the tube 33. The nib member 36 comprises a relatively short capillary tube, preferably formed from some metal as the supply tube 33, and is provided with an appropriately shaped tip 37 which engages a sheet of paper or other suitable recording medium 38 mounted upon a recording base 39. The nib 36 is not located at the terminal end of the tube 33, but preferably is located closely adjacent to the nib end 35 of the tube. During the use of the pen, ink is transferred through the tube in the direction indicated by the arrow A from an ink supply to the nib 36 and flows through the nib 36, by capillary action, in the writing of data upon the paper 38.

A cannelure disc or fitting 41 is mounted upon the nib end 35 of the ink conduit 33, being located beyond the nib 36. Preferably, the cannelure fitting comprises a pair of discs 41 formed as a single unitary mounting member, being connected by a central web portion 42. The disc assembly 41, 42 is secured to the nib end 35 of the tube 33 by suitable means and may, for example, be press fit or gold solder sweated to the ink supply tube. The discs 41 are utilized to mount a reservoir member 43 on the nib end 35 of the ink feeder tube 33, although other suitable mounting means may be employed if desired. The reservoir 43, in this embodiment of the invention, is formed from rubber or other similar resilient material. In this connection the term "rubber" as used in this specification and in the appended claims includes natural latex and any synthetic rubber or other elastomer of a similar nature. The reservoir member 43 communicates with and closes off the nib end of the ink feeder tube 33, forming the closed chamber 44. The end wall or sealing membrane 45 of the chamber 44 is made highly compliant in order that reservoir member 43 may function as a substantially frictionless piston, as described more fully hereinafter. Frequently, it is difficult to achieve adequate compliance with the end wall of the reservoir; a weight 46 may be mounted on the end wall to compensate for sub-optimum compliance of the reservoir wall.

In operation of the pen 32, ink is fed, primarily by capillary action, from the ink supply end 34 of the tube 33, through the tube in the direction of the arrow A, and into the nib member 36. When the pen is moved across the paper 38, and is maintained in contact therewith, the ink flows out of the nib member and records the desired data upon the paper recording medium. If the pen is moved across the paper in a direction substantially transverse to the arrow A, there is little effect upon the flow of ink through the tube 33 and the nub 36. If the pen is accelerated in the direction opposite that indicated by the arrow A, this being the normal direction of ink flow through the tube 33, the flow of ink may tend to increase to some extent. This is particularly true where the ink conduit 33 is made relatively small in diameter and is treated to afford a relatively low contact angle with respect to the ink, as described more fully hereinafter, to facilitate ink flow under normal conditions.

If the pen 32 is accelerated to any substantial extent, however, in the direction indicated by the arrow A, the flow of ink through the supply tube 33 and hence through the nib 36 may be adversely affected, disregarding the operation of the reservoir member 43. Thus, the inertia of the ink may cause a failure in the flow of ink to the nib, with the result that portions of the data to be transcribed upon the paper 38 may be omitted. Using a pen of the kind shown in FIG. 2, but no reservoir such as the reservoir 43 and no extension of the ink conduit beyond the nib, a failure of ink feed may occur at accelerations as low as 0.2 gravity, an acceleration which is frequently surpassed in graphic recording operations and particularly in reproduction of rapid handwriting.

The reservoir member 43, however, effectively overcomes this acceleration effect, and permits useful operation of the pen 32 at accelerations as high as 1.0 gravity. Thus, when the pen 32 is first placed in operation, the end wall 45 of the reservoir 43 may be pressed inwardly one or two times to pump ink into the nib end 35 of the tube 33 and into the chamber 44. It should be noted that it is not necessary that the chamber 44 be filled or even that any substantial amount of ink enters the chamber, although it is usually preferred that the chamber be filled. In any event, at least a substantial portion of the nib end 35 of the ink supply tube 33 must be filled. When this is done, and the pen 32 is accelerated in the direction indicated by the arrow A, the inertia of the ink in the reservoir 43 and in the nib end extension 35 causes the ink to flow from the nib end 35 of the supply tube 33 into the nib member 36. The high compliance of the end wall of the reservoir permits it to move toward the pen nib, preventing an excessive reduction in pressure in the reservoir due to ink flowing to the nib. Thus, the reservoir member 43 effectively supplies ink to the nib member 36 in a direction substantially opposite the normal direction of ink flow through the conduit 33 when the pen is accelerated in the normal direction of ink flow.

FIG. 3 illustrates a modification of the pen 32 (FIG. 2) which is substantially similar to the first described embodiment of the invention but which utilizes a somewhat different configuration for the frictionless piston or ink reservoir. Thus, the pen 52 illustrated in FIG. 3 comprises the ink supply tube 33 having a nib end 35, the nib 36 being connected to the tube 33 adjacent the nib end thereof. As before, ink flows through the tube 33, in the direction indicated by the arrow A, from a suitable ink source (not shown) and out through the nib 36 during normal operation of the pen.

The pen 52 further includes, as in the previously described embodiment, a pair of discs 41 which are mounted upon the nib end 35 of the ink supply tube 33 and are connected in a single mounting unit by the web 42. A reservoir member 53 is mounted on the discs 41 in substantially the same manner as in the arrangement illustrated in FIG. 2, the reservoir member 53 again being formed from rubber or other suitable elastomer. The reservoir member 53 forms a chamber 54 which communicates with and closes off the otherwise open nib end 35 of the ink supply tube 33. The end wall 55 of the chamber 54 is relatively thick, but is connected to the remainder of the reservoir member 53 by a relatively thin connecting wall 56, so that the overall end wall structure 55, 56 is highly compliant with respect to movement in a direction parallel to the axis of the tube 33.

Operation of the pen 52 of FIG. 3 is substantially similar to that described hereinabove with respect to the pen 32 of FIG. 2. A reserve supply of ink is normally maintained in the nib end 35 of the ink supply tube but is not utilized to supply the nib 36 so long as the pen is not accelerated to any substantial extent in the direction indicated by the arrow A. However, when the pen is accelerated in the direction of arrow A, ink flows from the reservoir chamber 54 to the nib 36. As before, the end wall 55 of the ink reservoir member 53 tends to move inwardly of the chamber 54, preventing the build-up of a vacuum in the reservoir which would otherwise interrupt ink flow. Thus, the reservoir member 53 comprises a closed chamber, the ink in the chamber serving as a substantially frictionless piston which counteracts the normal acceleration effects upon the ink supply to the nib 36. Furthermore, the reservoir member 53 affords substantial protection to the pen comprising the tube 33 and the nib 36 and prevents damage to the pen by accidental bumping of the pen which may occur in the use thereof.

FIG. 4 illustrates another pen structure 62 which in many respects is substantially similar to the construction shown in FIGS. 2 and 3. Thus, the pen 62 comprises the usual ink supply tube 33 having a nib member 36 connected thereto adjacent the nib end 35 of the tube. As before, the tube 33 may be relatively long and the end thereof opposite the nib 36 is connected to a suitable ink supply, ink being fed through the tube 33 primarily by capillary action. As before, a mounting structure comprising a pair of discs 41, preferably interconnected by a web portion 42, is mounted upon the nib end 35 of the tube 33 by suitable means, as by press fitting the disc structure on the tube.

The pen 62 includes a reservoir member 63 having an end wall 65 which forms a substantially hemispherical chamber 64 facing the open end of the nib end 35 of the tube 33. As in the previously described embodiments, the nib 36 moves across a paper or other suitable recording medium 38 supported upon a recording base 39 to perform a writing or other data recording operation.

Operation of the pen 62 of FIG. 4 is essentially the same as described hereinabove for the pens 32 and 52 (see FIGS. 2 and 3 respectively). The principal advantage in the use of the hemispherical chamber 64 formed by the end wall 65 of the reservoir member 63 of the pen 62 is that this shape is much easier to control, in fabrication of the pen, and operating results, therefore, may be somewhat more consistent, using a reservoir of this particular configuration. Using this configuration it is substantially easier to obtain the requisite high compliance for the end wall 65 of the reservoir. In this regard, it should be noted that one effective means for fabricating reservoir members such as the members 43, 53 and 63 (FIGS. 2, 3 and 4, respectively) is by dip-molding upon a suitable mold, and it is sometimes difficult to achieve complete control of the thickness of the molded product. With the construction illustrated in FIG. 4, minor variations in the end wall 65 do not affect operation of the reservoir member to the same extent as in the previously described embodiments, so that it is possible to maintain closer control of quality in this part of the pen. The reservoir member 63, like the members 43 and 53, also serves as a protective bumper for the delicate pen structure.

FIG. 5 illustrates a recording pen 72 which comprises a preferred embodiment of the invention and which utilizes a substantially different construction for the reservoir member employed to compensate for the effects of acceleration upon the supply of ink delivered to the pen. The basic pen structure, for the pen 72, is essentially the same as for the previously described embodiments, and again includes the ink supply tube 33 having a supply end 34 which may be connected to a suitable source of ink. Adjacent the opposite or nib end 35 of the tube 33, a nib member 36 is connected to the tube 33, the nib being provided with a suitably shaped end 37 which engages a paper or other suitable recording medium 38 supported upon a recording base 39. Thus, this portion of the pen structure is essentially the same as described hereinabove.

In this instance, however, the pen 72 is provided with an ink reservoir member 73 which is substantially different from the closed chamber constructions discussed hereinabove. The ink reservoir 73 comprises a flexible open-ended tube which is connected to and mounted upon the nib end 35 of the ink supply tube 33 and constitutes an extension of the ink supply tube. The reservoir member 73 may be formed from rubber or other similar material, but preferably is fabricated from a flexible plastic tubing of capillary size. Moreover, the internal surface of the plastic tube 73 may have a relatively low contact angle with respect to the ink employed in the pen 72. That is, the material used to form the tube 73 may be "wettable" by the ink. The tube 73 may be mounted on the nib end 35 of the pen simply by forcing the same over the end of the ink supply tubing.

Despite the differences in construction, operation of the pen 72 is essentially the same as for the embodiments of FIGS. 2–4. Thus, when the pen is placed in operation, some of the ink is drawn into the nib end 35 of the pen and, preferably, into a part of the reservoir member 73. Capillary action may be sufficient to accomplish this purpose, although in some instances it may be desirable to pump a small amount of ink into the nib end 35 of the ink supply tube and into the ink reservoir 73. Usually, it is desirable to keep the open end 74 of the reservoir member 73 free of ink; thus, the ink preferably does not extend beyond the central portion of the reservoir 73 as generally indicated by the dash line 75, in order to avoid spattering during use of the pen.

If the pen 72 is accelerated in a direction opposite that indicated by the arrow A, or in a direction generally transverse to the arrow A, the pen operates essentially as described hereinabove and there is little or no interference with the ink supply. If the pen is accelerated in the direction of arrow A, the ink in the reservoir 73 and in the nib end 35 of the ink supply tube is effectively driven, by virtue of its own inertia, in the direction opposite the arrow A and back into the nib 36. Thus, the pen 72 effectively compensates for and counteracts acceleration forces, in operation of the pen, which would otherwise interfere with an adequate supply of ink to the nib 36. Moreover, and like the previously described embodiments, the reservoir member 73 also serves as a protective bumper for the free end or nib end 35 of the delicate pen structure.

In some applications, and particularly where the movements of the pen into and out of contact with the paper are relatively rapid, it may be necessary to afford additional means to prevent ink from being forced out of the end of the open reservoir member 73. To this end, an additional extension tube 77 may be mounted on the reservoir member 73. This reservoir extension should be formed from a material having, or treated to have, a high contact angle with respect to the ink employed to inhibit capillary flow of ink into and through the extension, as illustrated in FIG. 5 by the dash line 78.

In order to afford a more specific example of the invention, certain data are set forth hereinafter relative to a specific pen structure of the type exemplified by the pen 72 in FIG. 5. These same data are equally applicable, with respect to parts having corresponding reference numerals, to the pens shown in FIGS. 2–4. It should be understood, however, that these data are provided solely by way of illustration and in no sense as a limitation upon the invention.

Length, supply tube 33 _____ 6 inches.
Outside diameter, supply tube 33 __ 0.032 inch.
Inside diameter, supply tube 33 __ 0.02 inch.
Length, nib 36 _____ 0.2 inch.
Outside diameter, nib 36 _____ 0.027 inch.
Inside diameter, nib 36 _____ 0.01 inch.
Material, tube 33 and nib 36 _____ No. 4 0 3 stainless steel.
Inside diameter, reservoir 73 ____ 0.032 inch.
Length, reservoir 73 _____ 0.25+ inch.

Material, reservoir 73 _____ Vinyl chloride tubing.
Length, reservoir extension 77 __ 0.125 inch.
Material, reservoir extension 77 __ polyfluoroethylenic resin.

Preferably, the stainless steel tubing used to fabricate members 33 and 36 is of seamless construction and is hardened. Furthermore, the internal surface of this tubing should be treated to afford a low contact angle with respect to the ink, which may usually be accomplished by oxidation, using nitric acid, or by coating the internal surface of the tubing with colloidal silica. The treatment of the internal surfaces of the pen tubing is quite advantageous in that it facilitates capillary action inducing ink flow through the tubing, a feature which may be of substantial importance particularly with respect to the operation of the ink reservoir.

The open-ended reservoir construction of FIG. 5 represents the preferred form of the invention, as noted hereinabove, because it is not dependent upon the compliance of a sealing wall and is not affected by the inertia of such a wall. On the other hand, if the pen is required to write on a vertical surface, the use of a sealed reservoir may be necessary. Moreover, if the pen is used in an environment where inordinate amounts of dust or dirt are present, the closed reservoir construction may be desirable in preventing clogging of the pen or contamination of the ink in the reservoir.

Hence, while we have illustrated and described the preferred embodiments of our invention, it is to be understood that these are capable of variation and modification.

We claim:

1. A pen for use in a graphic communication system recorder or similar recording apparatus in which the pen may be moved substantially omnidirectionally, under substantial and varying acceleration, said pen comprising: an ink feeder tube; a nib member, connected to said ink feeder tube adjacent one end thereof, for transferring ink, fed through said tube toward said nib end, from said tube to a record medium; and reservoir means, comprising an open-ended extension of said nib end of said ink feeder tube disposed substantially coaxially therewith, for supplying ink to said nib member, in a direction substantially opposite the normal direction of flow of ink through said tube, when said pen is accelerated in said normal direction of ink flow.

2. A pen for use in a graphic communication system recorder or similar recording apparatus in which the pen may be moved substantially omnidirectionally, under substantial and varying acceleration, said pen comprising: an ink feeder comprising an elongated capillary tube; a nib member comprising a short capillary tube connected to said ink feeder tube and projecting from said feeder tube adjacent one end thereof, for transferring ink, fed through said feeder tube toward said nib end, from said feeder tube to a record medium; and reservoir means, comprising an open-ended extension of said nib end of said ink feeder tube, disposed substantially coaxially therewith for supplying ink to said nib member, in a direction substantially opposite the normal direction of flow of ink through said tube, when said pen is accelerated in said normal direction of ink flow.

3. A pen for use in a graphic communication system recorder or similar recording apparatus in which the pen may be moved substantially omnidirectionally, under substantial and varying acceleration, said pen comprising: an ink feeder tube; a nib member, connected to said ink feeder tube adjacent one end thereof, for transferring ink, fed through said tube toward said nib end, from said tube to a record medium; and a reservoir for supplying ink to said nib member, in a direction substantially opposite the normal direction of flow of ink through said tube, when said pen is accelerated in said normal direction of ink flow, said reservoir comprising an open-ended tube connected to said nib end of said ink feeder tube, and formed of flexible material to afford a bumper for the pen disposed substantially coaxially therewith.

4. A pen for use in a graphic communication system recorder or similar recording apparatus in which the pen may be moved substantially omnidirectionally, under substantial and varying acceleration, said pen comprising: a metal ink feeder tube of capillary size, said feeder tube having an internal coating affording a relatively low contact angle with respect to the ink employed; a nib member, connected to said ink feeder tube adjacent one end thereof, for transferring ink, fed through said tube toward said nib end, from said tube to a record medium; and a reservoir for supplying ink to said nib member, in a direction substantially opposite the normal direction of flow of ink through said tube, when said pen is accelerated in said normal direction of ink flow, said reservoir comprising an open-ended tube of capillary size, at least the end portion of said tube having a relatively high contact angle with respect to the ink, connected to said nib end of said ink feeder tube and extending substantially coaxially therewith.

5. A pen for use in a graphic communication system recorder or similar recording apparatus in which the pen may be moved substantially omnidirectionally, under substantial and varying acceleration, said pen comprising: a metal ink feeder tube of capillary size; a nib member, connected to said ink feeder tube adjacent one end thereof, for transferring ink, fed through said tube toward said nib end, from said tube to a record medium; a reservoir for supplying ink to said nib member, in a direction substantially opposite the normal direction of flow of ink through said tube, when said pen is accelerated in said normal direction of ink flow, said reservoir comprising an open-ended tube of capillary size, having a relatively low contact angle with respect to the ink, connected to said nib end of said ink feeder tube and extending substantially coaxially therewith; and a reservoir extension comprising an open-ended tube connected to said reservoir as an extension thereof and having a relatively high contact angle with respect to said ink.

6. A pen for use in a graphic communication system recorder or similar recording apparatus in which the pen may be moved substantially omnidirectionally, under substantial and varying acceleration, said pen comprising: an ink feeder tube; a nib member, connected to said ink feeder tube adjacent one end thereof, for transferring ink, fed through said tube toward said nib end, from said tube to a record medium; and a reservoir for supplying ink to said nib member, in a direction substantially opposite the normal direction of flow of ink through said tube, when said pen is accelerated in said normal direction of ink flow, said reservoir comprising an open-ended extension of said nib end of said feeder tube and a chamber connected to and closing off said extension and having a highly compliant end wall structure facing the end of said ink feeder tube.

7. A pen for use in a graphic communication system recorder or similar recording apparatus in which the pen may be moved substantially omnidirectionally, under substantial and varying acceleration, said pen comprising: an open-ended ink feeder tube; a nib member, connected to said ink feeder tube adjacent an open end thereof, for transferring ink, fed through said tube toward said nib end, from said tube to a record medium; and a reservoir for supplying ink to said nib member, in a direction substantially opposite the normal direction of flow of ink through said tube, when said pen is accelerated in said normal direction of ink flow, said reservoir comprising a highly compliant rubber membrane mounted on and closing off said nib end of said ink feeder tube.

8. A pen for use in a graphic communication system recorder or similar recording apparatus in which the pen may be moved substantially omnidirectionally, under substantial and varying acceleration, said pen comprising: an open-ended ink feeder tube; a nib member, connected to said ink feeder tube adjacent an open end thereof, for transferring ink fed through said tube toward said nib end, from said tube to a record medium; and a reservoir for supplying ink to said nib member, in a direction substantially opposite the normal direction of flow of ink through said tube, when said pen is accelerated in said normal direction of ink flow, said reservoir comprising a rubber chamber connected to and closing off said nib end of said ink feeder tube, said reservoir having a highly compliant end wall of substantially hemispherical configuration.

References Cited in the file of this patent

UNITED STATES PATENTS

| | | |
|---|---|---|
| 896,193 | Baker | Aug. 18, 1908 |
| 1,790,659 | Gillen et al. | Feb. 3, 1931 |
| 2,118,212 | MacLaurin | May 24, 1938 |
| 2,198,021 | Wood | Apr. 23, 1940 |
| 2,216,248 | Moore | Oct. 1, 1940 |
| 2,590,294 | Both | Mar. 25, 1952 |

FOREIGN PATENTS

| | | |
|---|---|---|
| 763,351 | France | Feb. 12, 1934 |